W. S. Davis,
Water Wheel

No. 112,128. Patented Feb. 28, 1871.

Witnesses.
Chas. P. Sanborn
John Burgum

Inventor:
Walter S. Davis

United States Patent Office.

WALTER S. DAVIS, OF WARNER, NEW HAMPSHIRE.

Letters Patent No. 112,128, dated February 28, 1871.

IMPROVEMENT IN WATER-WHEEL CURBS.

The Schedule referred to in these Letters Patent and making part of the same.

I, WALTER S. DAVIS, of Warner, county of Merrimack and State of New Hampshire, have invented certain Improvements in Water-Wheel Curbs, of which the following is a specification.

Nature and Objects of the Invention.

The object of my invention is to better economize the power of water, and consists in arranging a number of gates around the curb corresponding with the number of apertures, which are made permanent in the curb, (in the present instance sixteen.) Said gates are opened two at a time in alternate succession, and on opposite sides of the curb, by means of a double circular arrangement of cams placed on the curb, and rotated by means of a rack and pinion.

Figure 1:
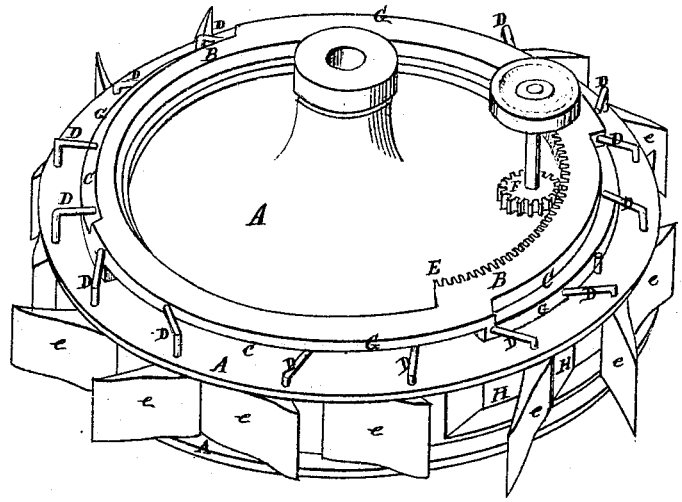
Figure 1 is a perspective view of the curb, showing half the gates open and the manner in which the cams operate them.
Figure 2:
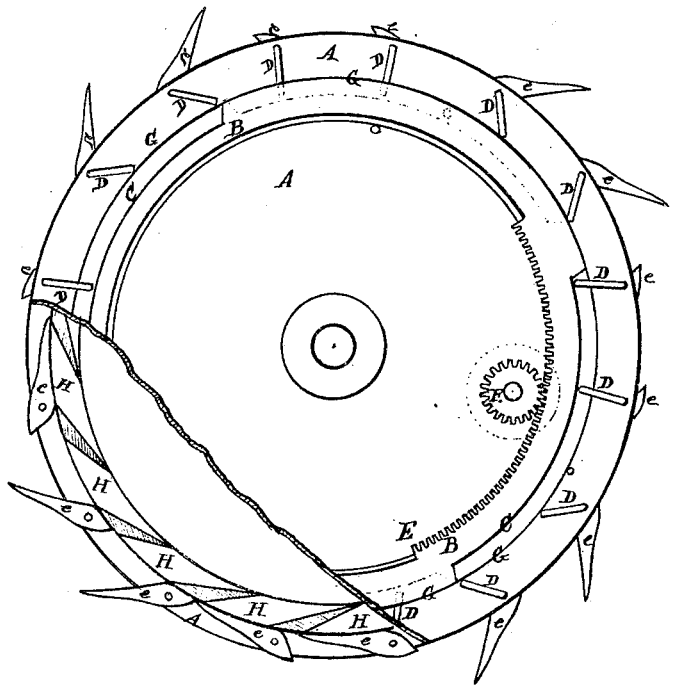
Figure 2 is a plan of the same, with a portion of the top removed, showing the apertures or water-guides to the wheel; also, the conformation of the gates and the manner in which they are hinged to the curb.

The following is a general description of my invention, reference being had to the accompanying drawing.

A is the body of the curb, which should be substantially made, to resist the pressure of the water and the vibrations of the operating parts.

B is the double circle of cams, which are quartered alternately into recesses and projections, two of each on the upper and lower sides of the cams.

The recesses C C C C receive the ends of the levers D D D when the gates e e e are shut.

In rotating the cams by means of the rack E and pinion F, the projections G G are so arranged as to open two gates at a time to their full extent, and on opposite sides of the curb, in alternate succession till the whole are open.

On reversing the motion the water closes the gates.

The levers D D D are fastened to the gates at one end, and form the hinge of the gate and fulcrum of the lever.

H H H are the apertures through which the water passes to the wheel, with the sides all straight and permanently attached to the curb, the leading or front side being tangent to the wheel.

Claims.

I claim as my invention—

1. The circle of cams B, quartered alternately into recesses and projections, two of each on the upper and lower sides of the circle, so that when made to revolve it will open one or more gates alternately, substantially as set forth.

2. The circles having the cams B, quartered into recesses and projections, as described, in combination with the levers D and gates e, when arranged to operate substantially as specified.

WALTER S. DAVIS.

Witnesses:
   STILLMAN C. DAVIS,
   CHARLES P. SAWYER.